Patented May 7, 1946

2,400,057

UNITED STATES PATENT OFFICE 2,400,057

COMPOUNDING AND VULCANIZATION OF SYNTHETIC RUBBER

Albert A. Somerville, Carmel, N. Y., assignor to R. T. Vanderbilt Company, Inc., New York, N. Y., a corporation of New York No Drawing. Application February 17, 1944, Serial No. 522,785

24 Claims. (Cl. 260—79)

My invention relates to improvements in the compounding and vulcanization of synthetic rubbers of the type produced by copolymerization of butadiene and styrene. This type of synthetic rubber is illustrated by the product currently designated GR-S rubber. My invention includes a modified unvulcanized copolymer and the product of vulcanization of the modified copolymer.

Variability, particularly with respect to rate of cure, has been one of the characteristics of GR-S rubber currently available involving a variety of substantial difficulties in the manufacture of vulcanized products from GR-S stocks. Even though supposedly identical techniques and formulations are used by several producers, such synthetic rubber from one producer will, for example, exhibit a generally higher rate of cure than that from others. But different samples from a single five ton lot from one producer will also frequently exhibit markedly different rates of cure. This variability is a serious burden upon the production of vulcanized products and involves the production of substantial quantities of defective goods. Defects frequently appear, for example, in inner tube sections adjacent value parts and in relatively thick sections subjected to rapid curing as in rubber heels as the result of such variability.

In studying the properties of GR-S stocks, I added measured quantities of metallic copper to a GR-S compound to determine the precise effect of copper in such compounds after I heard reports that GR-S stocks frequently failed to cure when applied as insulation in contact with copper, for example in areas of defective tinning when applied to tinned copper conductors as in conventional practice. Copper is rigorously excluded from natural rubber compounds; copper seriously degrades vulcanized natural rubber compounds and radically accelerates ageing of such compounds. To my amazement, I found that appropriate additions of copper accelerated the vulcanization of the GR-S stocks I used in my experiments without adversely affecting their properties with respect to ageing. The acceleration in rate of cure was so great as to submerge the variability in rate of cure ordinarily exhibited by GR-S rubber. When I attempted to reconcile these results with the reports which provoked my experiments, I found that the GR-S compounds which exhibited such curing failures were so-called sulfurless stocks. Continuing my experiments, with this clue, I found that my new results were obtained with appropriate additions of copper, as such or as an appropriate compound, in compounds of GR-S rubber containing an amount of sulfur, as such, exceeding the amount required to form cupric sulfide with the copper present. Sulfur combines with copper, to form cupric sulfide, in amount about 50% by weight on the copper. The range of copper additions with which my new results were attained approximated 0.005–1% by weight on the GR-S rubber. With additions below the lower limit, 0.005%, my new results were not regularly attained. With additions above 1%, the results began to resemble those incident to the addition of copper to natural rubber compounds. I also tried the addition of copper to other types of synthetic rubber but my new results seemed to be peculiar to GR-S type synthetic rubber. These new results contradicted all my previous experience with other rubbers.

The following examples will illustrate practices embodying my invention and include comparisons indicating some of its advantages. In the tabulations of these compounds, cures and physical properties, the compound of each example was made up of the number of parts by weight indicated opposite each designated component, the cures were in a platen press for the periods indicated in minutes at the left under the curing temperature, all of the cures in each group being effected at the same temperature, and, for each period of cure, the values for stress at 300% elongation in pounds per square inch appear under "S," for tensile strength in pounds per square inch under "T" and for percentage elongation at break under "E."

|  | Example I | Example II | Example III | Example IV |
|---|---|---|---|---|
| GR-S rubber | 100 | 100 | 100 | 100 |
| Plasticizer | 5 | 5 | 5 | 5 |
| Zinc oxide | 5 | 5 | 5 | 5 |
| Channel carbon black | 50 | 50 | 50 | 50 |
| Sulfur | 2 | 2 | 2 | 2 |
| Benzothiazyldisulphide | 1.5 | 1.5 | 1.5 | 1.5 |
| Zinc diethyldithiocarbamate | .15 | .15 | .15 | .15 |
| Powdered copper |  | .10 | .50 | 1 |

BEFORE AGEING

| 307° F. | S | T | E | S | T | E | S | T | E | S | T | E |
|---|---|---|---|---|---|---|---|---|---|---|---|---|
| 10 minutes | 275 | 910 | 745 | 1130 | 2280 | 445 | 1070 | 2600 | 540 | 830 | 2580 | 600 |
| 15 minutes | 550 | 2160 | 700 | 1510 | 2400 | 395 | 1430 | 2380 | 415 | 1220 | 2220 | 430 |
| 20 minutes | 770 | 2650 | 625 | 1710 | 2520 | 385 | 1570 | 2500 | 400 | 1260 | 2480 | 430 |
| 30 minutes | 1090 | 2680 | 505 | 1820 | 2640 | 385 | 1630 | 2460 | 400 | 1590 | 2650 | 425 |

AFTER 24 HOURS IN HOT AIR OVEN AT 250° F.

| | S | T | E | S | T | E | S | T | E | S | T | E |
|---|---|---|---|---|---|---|---|---|---|---|---|---|
| 10 minutes | | 1630 | 150 | | 1200 | 100 | | 1220 | 115 | | 1380 | 130 |
| 15 minutes | | 1200 | 110 | | 1320 | 115 | | 1290 | 105 | | 1340 | 130 |
| 20 minutes | | 1320 | 125 | | 1490 | 130 | | 1360 | 130 | | 1520 | 150 |
| 30 minutes | | 1450 | 135 | | 1640 | 140 | | 1450 | 140 | | 1640 | 155 |

SHORE HARDNESS BEFORE AGEING

| | | | | |
|---|---|---|---|---|
| 10 minutes | 45 | 59 | 60 | 59 |
| 15 minutes | 53 | 63 | 61 | 60 |
| 20 minutes | 56 | 65 | 63 | 61 |
| 30 minutes | 60 | 65 | 64 | 63 |

AFTER 24 HOURS IN HOT AIR OVEN AT 250° F.

| | | | | |
|---|---|---|---|---|
| 10 minutes | 77 | 81 | 81 | 80 |
| 15 minutes | 80 | 81 | 80 | 80 |
| 20 minutes | 80 | 81 | 80 | 80 |
| 30 minutes | 80 | 81 | 80 | 80 |

The foregoing Examples I to IV illustrate the results of my first experiments with copper in GR-S rubber. The copper used was electrolytic copper passing a 300 mesh per inch screen. The acceleration in rate of cure will be apparent from a comparison of the physical properties particularly for the 10 and 15 minute cures.

|  | Example V | Example VI | Example VII | Example VIII | Example IX |
|---|---|---|---|---|---|
| GR-S rubber | 100 | 100 | 100 | 100 | 100 |
| Plasticizer | 5 | 5 | 5 | 5 | 5 |
| Zinc oxide | 5 | 5 | 5 | 5 | 5 |
| Channel carbon black | 50 | 50 | 50 | 50 | 50 |
| Sulfur | 2 | 2 | 2 | 2 | 2 |
| Benzothiazyldisulphide | 1.5 | 1.5 | 1.5 | 1.5 | 1.5 |
| Zinc diethyldithiocarbamate | .15 | .15 | .15 | .15 | .15 |
| Powdered copper |  | .5 | 1 | 3 | 5 |

BEFORE AGEING

| 307° F. | S | T | E | S | T | E | S | T | E | S | T | E | |
|---|---|---|---|---|---|---|---|---|---|---|---|---|---|
| 3 minutes | Uncured | | | 240 | 520 | 610 | Uncured | | | Uncured | | | Uncured |
| 5 minutes | Uncured | | | 450 | 1515 | 650 | 270 | 535 | 620 | Uncured | | | Uncured |
| 10 minutes | 455 | 1620 | 650 | 1190 | 2470 | 490 | 775 | 2340 | 610 | 275 | 435 | 580 | Uncured |
| 15 minutes | 740 | 2490 | 635 | 1490 | 2360 | 400 | 1300 | 2610 | 465 | 385 | 1110 | 615 | Uncured |
| 20 minutes | 1140 | 2820 | 530 | 1740 | 2060 | 345 | 1690 | 2410 | 385 | 585 | 1930 | 630 | Uncured |

|  | Example X | Example XI | Example XII | Example XIII |
|---|---|---|---|---|
| GR-S rubber | 100 | 100 | 100 | 100 |
| Plasticizer | 5 | 5 | 5 | 5 |
| Zinc oxide | 5 | 5 | 5 | 5 |
| Channel carbon black | 50 | 50 | 50 | 50 |
| Sulfur | 2 | 2 | 2 | 2 |
| Benzothiazyldisulphide | 1.5 | 1.5 | 1.5 | 1.5 |
| Zinc diethyldithiocarbamate | .15 | .15 | .15 | .15 |
| Powdered copper | .10 | .01 | .005 | .001 |

| 307° F. | S | T | E | S | T | E | S | T | E | S | T | E |
|---|---|---|---|---|---|---|---|---|---|---|---|---|
| 3 minutes | 675 | 2025 | 615 | Uncured | | | Uncured | | | Uncured | | |
| 10 minutes | 1375 | 2275 | 415 | 740 | 2360 | 610 | 630 | 1850 | 565 | 365 | 1300 | 670 |
| 15 minutes | 1670 | 2355 | 390 | 1140 | 2475 | 500 | 1055 | 2575 | 545 | 705 | 2300 | 610 |
| 20 minutes | 1865 | 2080 | 315 | 1365 | 2375 | 415 | 1290 | 2465 | 460 | 1025 | 2100 | 470 |
| 30 minutes | 2025 | 2265 | 340 | 1710 | 2220 | 370 | 1695 | 2110 | 360 | 1450 | 2440 | 435 |

The foregoing Examples V to XIII illustrate the effect of variations in the amount of added copper. Again the copper used was electrolytic copper passing a 300 mesh screen. Useful results were secured with the addition of copper in amounts ranging from about 0.005% to about 1% on the GR-S rubber. I have secured optimum results with the addition of copper in amounts ranging from about 0.1% to about 0.5% on the GR-S rubber. It will be noted that the sulfur exceeds 50% by weight on the copper in each of the foregoing examples other than the blank, Example V, and the example using 5 parts of copper. Notwithstanding the excess of sulfur used in Example VIII, the results are unsatisfactory with as much as 3 parts of copper. I have examined sections of vulcanizates of Examples VI, VII, X, XI and XII under a microscope at 100 magnifications and these appear, The foregoing Examples XIV to XVI illustrate the advantage of thorough dispersion of the copper. Dispersion may be accomplished by using finely divided copper, as in Examples II-IV, VI-XIII and XV or by using copper compounds soluble or partially soluble in the rubber or by using copper compounds predispersed in or upon some appropriate compounding material. For example, copper compounds may be dispersed upon inert fillers or they may be dissolved or dispersed in plasticizers such as mineral oils, coal tar fractions, and esters such as dibutylphthalate. In general, the copper addition may be made to the copolymer of butadiene and styrene, before or during compounding, or it may be made to any compounding material with which it is compatible and thus incorporated in the synthetic rubber compound with the modified compounding material.

|  | Example XVII | Example XVIII | Example XIX | Example XX | Example XXI |
|---|---|---|---|---|---|
| GR-S rubber | 100 | 100 | 100 | 100 | 100 |
| Plasticizer | 5 | 5 | 5 | 5 | 5 |
| Zinc oxide | 5 | 5 | 5 | 5 | 5 |
| Channel carbon black | 50 | 50 | 50 | 50 | 50 |
| Sulfur | 2 | 2 | 2 | 2 | 2 |
| Benzothiazyldisulphide | 1.5 | 1.5 | 1.5 | 1.5 | 1.5 |
| Zinc diethyldithiocarbamate | .15 | .15 | .15 | .15 | .15 |
| Copper powder (through 300 mesh) |  | .10 |  |  |  |
| Copper sulfide |  |  | .15 |  |  |
| Copper sulfate (anhydrous) |  |  |  | .25 |  |
| Copper carbonate |  |  |  |  | .174 |

BEFORE AGEING

| 307° F. | S | T | E | S | T | E | S | T | E | S | T | E | S | T | E |
|---|---|---|---|---|---|---|---|---|---|---|---|---|---|---|---|
| 5 minutes | Uncured |  |  | 305 | 650 | 560 | 460 | 1080 | 580 | 440 | 1080 | 620 | 415 | 1100 | 575 |
| 10 minutes | 320 | 1100 | 735 | 1080 | 2060 | 530 | 1130 | 2780 | 545 | 1220 | 2620 | 490 | 1355 | 2650 | 460 |
| 15 minutes | 635 | 2310 | 655 | 1480 | 2620 | 405 | 1380 | 2620 | 450 | 1610 | 2640 | 415 | 1780 | 2425 | 365 |
| 20 minutes | 870 | 2700 | 590 | 1630 | 2720 | 425 | 1580 | 2490 | 360 | 1850 | 2630 | 375 | 1920 | 2030 | 315 |
| 30 minutes | 1350 | 2640 | 430 | 1910 | 2470 | 365 | 1730 | 2540 | 385 | 2240 | 2520 | 345 | 1930 | 1930 | 300 |

AFTER 24 HOURS IN HOT AIR OVEN AT 250° F.

| 307° F. | S | T | E | S | T | E | S | T | E | S | T | E | S | T | E |
|---|---|---|---|---|---|---|---|---|---|---|---|---|---|---|---|
| 5 minutes |  |  |  |  | 1140 | 100 |  | 1060 | 90 |  | 1400 | 105 |  | 1500 | 115 |
| 10 minutes |  | 1170 | 110 |  | 1180 | 95 |  | 1210 | 105 |  | 1390 | 110 |  | 1530 | 110 |
| 15 minutes |  | 1310 | 110 |  | 1370 | 110 |  | 1420 | 110 |  | 1380 | 105 |  | 1570 | 115 |
| 20 minutes |  | 1410 | 125 |  | 1310 | 110 |  | 1460 | 115 |  | 1570 | 115 |  | 1520 | 120 |
| 30 minutes |  | 1500 | 115 |  | 1440 | 125 |  | 1530 | 120 |  | 1620 | 140 |  | 1480 | 125 | thus examined, to contain dispersed particles of copper with surfaces darkened as by a film of sulfide.

|  | Example XIV | Example XV | Example XVI |
|---|---|---|---|
| GR-S rubber | 100 | 100 | 100 |
| Plasticizer | 5 | 5 | 5 |
| Zinc oxide | 5 | 5 | 5 |
| Channel carbon black | 50 | 50 | 50 |
| Sulfur | 2 | 2 | 2 |
| Benzothiazyldisulphide | 1.5 | 1.5 | 1.5 |
| Zinc diethyldithiocarbamate | .15 | .15 | .15 |
| Copper powder through 300-mesh screen | --- | .1 | --- |
| Copper powder through 40-mesh screen | --- | --- | .1 |

| 307° F. | S | T | E | S | T | E | S | T | E |
|---|---|---|---|---|---|---|---|---|---|
| 5 minutes | Uncured |  |  | 245 | 500 | 475 | Uncured |  |  |
| 10 minutes | 250 | 810 | 695 | 1200 | 2520 | 480 | 510 | 1840 | 650 |
| 15 minutes | 600 | 2000 | 600 | 1620 | 2100 | 345 | 1030 | 2400 | 510 |
| 20 minutes | 860 | 2360 | 555 | 1820 | 2540 | 390 | 1210 | 2420 | 450 |
| 30 minutes | 1320 | 2740 | 490 | 2100 | 2530 | 350 | 1580 | 2280 | 380 |

The foregoing examples XVII to XXI illustrate the effectiveness of a variety of copper compounds. The amounts of the several compounds used in Examples XIX, XX and XXI are such that the copper, measured as copper, present approximates that in Example XVIII. The copper compounds I have tried which produce comparable results, in terms of the amount of copper measured as copper thus added to the GR-S rubber, include copper sulfide, cuprous oxide, anhydrous copper sulfate, copper sulfate with water of crystallization, copper carbonate, copper nitrate, copper acetate, cuprous chloride, cupric chloride, copper oleate and copper stearate. In fact the only copper compound I have tried which failed to give my new results, used in appropriate amounts corresponding to their equivalents as copper, is cupric oxide. I have no explanation for this anomaly, but the following examples XXII to XXV will illustrate my findings.

tin, tungsten and zinc. Copper appears to be unique.

|  | Example XXII | | | Example XXIII | | | Example XXIV | | | Example XXV | | |
|---|---|---|---|---|---|---|---|---|---|---|---|---|
| GR-S rubber | 100 | | | 100 | | | 100 | | | 100 | | |
| Plasticizer | 5 | | | 5 | | | 5 | | | 5 | | |
| Zinc oxide | 5 | | | 5 | | | 5 | | | 5 | | |
| Channel carbon black | 50 | | | 50 | | | 50 | | | 50 | | |
| Sulfur | 2 | | | 2 | | | 2 | | | 2 | | |
| Benzothiazyldisulphide | 1.5 | | | 1.5 | | | 1.5 | | | 1.5 | | |
| Zinc diethyldithiocarbamate | .15 | | | .15 | | | .15 | | | .15 | | |
| Copper powder (through 300 mesh) | --- | | | .1 | | | --- | | | --- | | |
| Cupric oxide | --- | | | --- | | | .125 | | | --- | | |
| Cuprous oxide | --- | | | --- | | | --- | | | .115 | | |

BEFORE AGEING

| 307° F. | S | T | E | S | T | E | S | T | E | S | T | E |
|---|---|---|---|---|---|---|---|---|---|---|---|---|
| 5 minutes | Uncured | | | 305 | 650 | 560 | Uncured | | | 470 | 1160 | 585 |
| 10 minutes | 320 | 1100 | 735 | 1080 | 2680 | 530 | 380 | 1130 | 670 | 1220 | 2560 | 470 |
| 15 minutes | 635 | 2310 | 655 | 1480 | 2620 | 405 | 710 | 2260 | 615 | 1650 | 2580 | 400 |
| 20 minutes | 870 | 2700 | 580 | 1630 | 2720 | 425 | 1030 | 2290 | 490 | 1900 | 2460 | 350 |
| 30 minutes | 1350 | 2640 | 430 | 1910 | 2470 | 365 | 1370 | 2110 | 390 | 2050 | 2480 | 335 |

AFTER 24 HOURS IN HOT AIR OVEN AT 250° F.

| | S | T | E | S | T | E | S | T | E | S | T | E |
|---|---|---|---|---|---|---|---|---|---|---|---|---|
| 5 minutes | | | | | 1140 | 100 | | | | | 1190 | 95 |
| 10 minutes | | 1170 | 110 | | 1150 | 95 | | 860 | 100 | | 1350 | 105 |
| 15 minutes | | 1310 | 110 | | 1370 | 110 | | 960 | 95 | | 1420 | 110 |
| 20 minutes | | 1410 | 125 | | 1310 | 110 | | 1080 | 105 | | 1520 | 120 |
| 30 minutes | | 1500 | 115 | | 1440 | 125 | | 1110 | 105 | | 1470 | 115 |

The invention includes the use of metallic copper and equivalent weights of compounds of copper, particularly salts including soaps of copper and cuprous oxide, but excludes the use of cupric oxide. I disclaim cupric oxide as a compound of copper embodying my invention.

The plasticizer used in the foregoing examples was a mixture of 15 parts by weight of a petroleum sulfonate, 5 parts of normal butyl alcohol and 80 parts of a viscous petroleum oil (currently sold under the trade-name "Reogen").

In carrying out my invention the copper, or

|  | Example XXVI | | | Example XXVII | | | Example XXVIII | | | Example XXIX | | | Example XXX | | |
|---|---|---|---|---|---|---|---|---|---|---|---|---|---|---|---|
| GR-S rubber | 100 | | | 100 | | | 100 | | | 100 | | | 100 | | |
| Plasticizer | 5 | | | 5 | | | 5 | | | 5 | | | 5 | | |
| Zinc oxide | 5 | | | 5 | | | 5 | | | 5 | | | 5 | | |
| Channel carbon black | 50 | | | 50 | | | 50 | | | 50 | | | 50 | | |
| Benzothiazyldisulphide | 1.5 | | | 1.5 | | | 1.5 | | | 1.5 | | | 1.5 | | |
| Zinc diethyldithiocarbamate | .15 | | | .15 | | | .15 | | | .15 | | | .15 | | |
| Sulfur | 2 | | | 2 | | | 2 | | | 2 | | | 2 | | |
| Powdered copper | --- | | | .1 | | | --- | | | --- | | | --- | | |
| Powdered iron | --- | | | --- | | | .1 | | | --- | | | --- | | |
| Powdered manganese | --- | | | --- | | | --- | | | .1 | | | --- | | |
| Powdered lead | --- | | | --- | | | --- | | | --- | | | .1 | | |

BEFORE AGEING

| 307° F. | S | T | E | S | T | E | S | T | E | S | T | E | S | T | E |
|---|---|---|---|---|---|---|---|---|---|---|---|---|---|---|---|
| 10 minutes | 250 | 810 | 695 | 1010 | 2440 | 525 | 320 | 1060 | 725 | 370 | 1400 | 705 | 600 | 1270 | 545 |
| 15 minutes | 600 | 2000 | 600 | 1230 | 2620 | 470 | 580 | 2180 | 660 | 680 | 2290 | 630 | 1130 | 2020 | 440 |
| 20 minutes | 860 | 2360 | 555 | 1460 | 2420 | 405 | 870 | 2700 | 595 | 970 | 1970 | 500 | 1480 | 2000 | 375 |
| 30 minutes | 1320 | 2740 | 490 | 1640 | 2400 | 400 | 1350 | 2650 | 460 | 1300 | 1730 | 370 | 1750 | 1770 | 305 |

AFTER AGEING 24 HOURS IN HOT AIR OVEN AT 250° F.

| | S | T | E | S | T | E | S | T | E | S | T | E | S | T | E |
|---|---|---|---|---|---|---|---|---|---|---|---|---|---|---|---|
| 10 minutes | | 875 | 110 | | 1410 | 120 | | 1610 | 135 | | 1490 | 125 | | 895 | 85 |
| 15 minutes | | 1240 | 120 | | 1460 | 120 | | 1640 | 125 | | 1240 | 105 | | 1040 | 100 |
| 20 minutes | | 1100 | 105 | | 1360 | 120 | | 1640 | 130 | | 935 | 85 | | 1130 | 105 |
| 30 minutes | | 1290 | 115 | | 1320 | 120 | | 1310 | 110 | | 810 | 75 | | 1160 | 100 |

The foregoing Examples XXVIII to XXX illustrate the results secured with other metals. The metals used, including the copper in Example XXVII, passed a 300 mesh screen. Iron was the only metal showing any marked improvement, and it was effective in improving physical properties only in the longer cures, 20 and 30 minutes, lacking the accelerating effect of copper. The metals I have tried, without approaching my new results with copper, include aluminum, antimony, bismuth, cadmium, chromium, iron, lead, manganese, molybdenum, nickel, silicon, silver, its equivalent compound, may be incorporated in the copolymer of butadiene and styrene before other compounding materials are added to produce a modified copolymer product exhibiting much less variability than currently available GR-S rubber when compounded with sulfur and subjected to vulcanization. My invention includes this modified copolymer containing about 0.005–1% or better about 0.01–0.5% by weight of copper on the copolymer. My invention also includes the vulcanizable but unvulcanized copolymer containing about 0.005–1% or better about 0.01–0.5% by weight of copper on the copolymer and upwards of about 50% by weight on the copper of sulfur and the product of vulcanization of such copolymers containing copper and sulfur. The proportion of sulfur used is not critical and may follow conventional practices providing it is added to the compound subjected to vulcanization in amount exceeding that required to combine with the added copper to form cupric sulfide.

I claim:

1. A rubbery copolymer of butadiene and styrene containing as a sulphur vulcanization accelerator about 0.005–1% (calculated as copper) by weight on the copolymer of a material of the class consisting of metallic copper and compounds of copper effective to accelerate the sulphur vulcanization of the copolymer.

2. A rubbery copolymer of butadiene and styrene containing as a sulphur vulcanization accelerator about 0.005–1% by weight on the copolymer of metallic copper.

3. A rubbery copolymer of butadiene and styrene containing as a sulphur vulcanization accelerator about 0.005–1% (calculated as copper) by weight on the copolymer of a salt of copper.

4. A rubbery copolymer of butadiene and styrene containing as a sulphur vulcanization accelerator about 0.005–1% (calculated as copper) by weight on the copolymer of cuprous oxide.

5. A rubbery copolymer of butadiene and styrene containing about 0.005–1% (calculated as copper) by weight on the copolymer of a material of the class consisting of metallic copper and compounds of copper effective to accelerate the vulcanization of the copolymer and in excess of 50% by weight on the copper of sulfur.

6. A rubbery copolymer of butadiene and styrene containing about 0.005–1% by weight on the copolymer of metallic copper and in excess of 50% by weight on the copper of sulfur.

7. A rubbery copolymer of butadiene and styrene containing about 0.005–1% (calculated as copper) by weight on the copolymer of a salt of copper and in excess of 50% by weight on the copper of sulfur.

8. A rubbery copolymer of butadiene and styrene containing about 0.005–1% (calculated as copper) by weight on the copolymer of cuprous oxide and in excess of 50% by weight on the copper of sulfur.

9. A rubbery copolymer of butadiene and styrene containing as a sulphur vulcanization accelerator about 0.01–0.5% (calculated as copper) by weight on the copolymer of a material of the class consisting of metallic copper and compounds of copper effective to accelerate the sulphur vulcanization of the copolymer.

10. A rubbery copolymer of butadiene and styrene containing as a sulphur vulcanization accelerator about 0.01–0.5% by weight on the copolymer of metallic copper.

11. A rubbery copolymer of butadiene and styrene containing as a sulphur vulcanization accelerator about 0.01–0.5% (calculated as copper) by weight on the copolymer of a salt of copper.

12. A rubbery copolymer of butadiene and styrene containing as a sulphur vulcanization accelerator about 0.01–0.5% (calculated as copper) by weight on the copolymer of cuprous oxide.

13. The product of vulcanization of a rubbery copolymer of butadiene and styrene containing about 0.005–1% (calculated as copper) by weight on the copolymer of a material of the class consisting of metallic copper and compounds of copper effective to accelerate the vulcanization of the copolymer and in excess of 50% by weight on the copper of sulfur.

14. The product of vulcanization of a rubbery copolymer of butadiene and styrene containing about 0.005–1% by weight on the copolymer of metallic copper and in excess of 50% by weight on the copper of sulfur.

15. The product of vulcanization of a rubbery copolymer of butadiene and styrene containing about 0.005–1% (calculated as copper) by weight on the copolymer of a salt of copper and in excess of 50% by weight on the copper of sulfur.

16. The product of vulcanization of a rubbery copolymer of butadiene and styrene containing about 0.005–1% (calculated as copper) by weight on the copolymer of cuprous oxide and in excess of 50% by weight on the copper of sulfur.

17. A rubbery copolymer of butadiene and styrene containing about 0.01–0.5% (calculated as copper) by weight on the copolymer of a material of the class consisting of metallic copper and compounds of copper effective to accelerate the vulcanization of the copolymer and in excess of 50% by weight on the copper of sulfur.

18. A rubbery copolymer of butadiene and styrene containing about 0.01–0.5% by weight on the copolymer of metallic copper and in excess of 50% by weight on the copper of sulfur.

19. A rubbery copolymer of butadiene and styrene containing about 0.01–0.5% (calculated as copper) by weight on the copolymer of a salt of copper and in excess of 50% by weight on the copper of sulfur.

20. A rubbery copolymer of butadiene and styrene containing about 0.01–0.5% (calculated as copper) by weight on the copolymer of cuprous oxide and in excess of 50% by weight on the copper of sulfur.

21. The product of vulcanization of a rubbery copolymer of butadiene and styrene containing about 0.01–0.5% (calculated as copper) by weight on the copolymer of a material of the class consisting of metallic copper and compounds of copper effective to accelerate the vulcanization of the copolymer and in excess of 50% by weight on the copper of sulfur.

22. The product of vulcanization of a rubbery copolymer of butadiene and styrene containing about 0.01–0.5% by weight on the copolymer of metallic copper and in excess of 50% by weight on the copper of sulfur.

23. The product of vulcanization of a rubbery copolymer of butadiene and styrene containing about 0.01–0.5% (calculated as copper) by weight on the copolymer of a salt of copper and in excess of 50% by weight on the copper of sulfur.

24. The product of vulcanization of a rubbery copolymer of butadiene and styrene containing about 0.01–0.5% (calculated as copper) by weight on the copolymer of cuprous oxide and in excess of 50% by weight on the copper of sulfur.

ALBERT A. SOMERVILLE.